United States Patent [19]

Onitsuka

[11] 4,143,551

[45] Mar. 13, 1979

[54] INDICATING APPARATUS IN CENTRIFUGAL FORCE TYPE METER

[75] Inventor: Nobuyuki Onitsuka, Miyazaki, Japan

[73] Assignee: Kabushiki Kaisha Honda Rokku, Miyazaki, Japan

[21] Appl. No.: 844,264

[22] Filed: Oct. 21, 1977

[30] Foreign Application Priority Data

Oct. 23, 1976 [JP] Japan .......................... 51-143364[U]
Feb. 23, 1977 [JP] Japan ............................ 52-22051[U]

[51] Int. Cl.² ............................................... G01P 3/18
[52] U.S. Cl. .......................................... 73/535; 73/551
[58] Field of Search ................. 73/498, 530, 534, 535, 73/539, 545, 548, 551

[56] References Cited

U.S. PATENT DOCUMENTS 815,108  3/1906  Loring ............................... 73/534 X
2,252,947  8/1941  Reed .................................. 73/551 X

*Primary Examiner*—James J. Gill
*Attorney, Agent, or Firm*—Haseltine, Lake & Waters

[57] ABSTRACT

A speedometer of a centrifugal force type member employing weight members which are rotatable with a shaft for transmission to a thrust member. Displacement of the thrust member takes place and carries a pointer to move with respect to a scale.

1 Claim, 14 Drawing Figures

INDICATING APPARATUS IN CENTRIFUGAL FORCE TYPE METER

BACKGROUND OF THE INVENTION

This invention relates to an indicating apparatus in a centrifugal force type meter. More particularly the invention is directed to such a meter used as a speedometer or a rotation meter in a bicycle on a small-sized motorized two-wheeled vehicle.

Up to the present, this kind of meter has not practically been used as a running speedometer for a bicycle or a motorized two-wheeled vehicle due to a number of shortcomings particularly relating to accuracy.

SUMMARY OF THE INVENTION

The main object of the present invention is to overcome the defects of the prior art.

Another object of the invention is an indicating apparatus which is free from fluctuation of a pointer.

A further object of the invention is an apparatus simple in construction.

The principal features of the invention are directed to an indicating apparatus in a centrifugal force type meter employing weight members that are radially directed to rotate with a driving shaft for transmission to a thrust member disposed in the axial direction thereof; pointer means disposed in relation to a scale responsive of said thrust member wherein; said thrust member being formed as a tubular body having an opening portion in the central axial direction thereof; and said pointer means being provided with a turning shaft formed into a screw shaft being turned by engagement with a narrowed portion of said tubular body at the opening portion thereof.

Also, within the scope of the invention is a driving shaft being provided with a weight guiding member for guiding said weight member in a radial direction and preventing the vertical movement thereof.

IN THE DRAWINGS

FIG. 1 is a view of one example of a conventional speedometer,

FIG. 2 is a side view, partly omitted, of an important portion of a speedometer according to this invention in an ordinary inoperative condition, FIG. 3A is a sectional view taken along line III—III in FIG. 2, FIG. 3B is a similar view taken along the same line in FIG. 2, in other condition at an operation time, FIG. 4 is a perspective view of a guide member, FIG. 5 is a perspective view of a weight, FIG. 6 is a side view of a pointer shaft, FIG. 7A is a sectional view of an important portion of a thrust collar, FIG. 7B is a section view taken along the line VII—VII in FIG. 7A, FIG. 8 is a side view of a pointer shaft of another example, FIG. 9A is a sectional view of an important portion of the thrust collar, FIG. 9B is a sectional view taken along the line IX—IX in FIG. 9A.

PREFERRED EMBODIMENTS OF THE INVENTION

Figure 1:
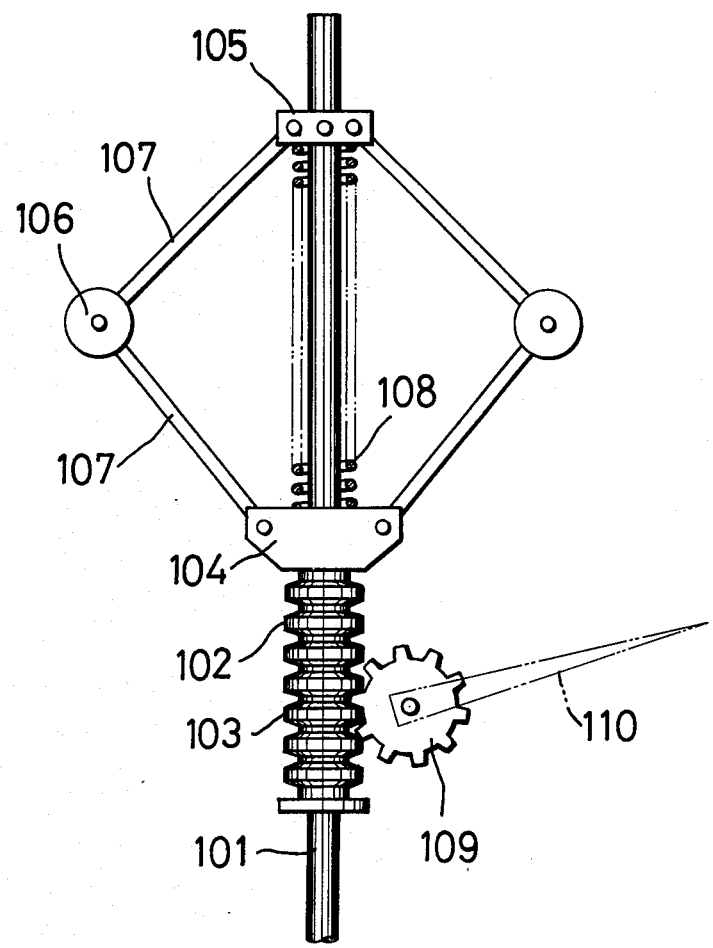

FIG. 1 shows an example of a conventional centrifugal force type meter typical of the prior art. Such structure employs a driving shaft 101 inserted through a tube with teeth 103 having a desired number of teeth 102, a movable frame 104 is fixed to the upper portion of the tube 103. A stationary frame 105 is fixed to the upper portion of the driving shaft 101 interconnects with the aforementioned structural members by means of a pair of arms 107 each having a weight 106 mounted thereon, a spring 108 is interposed between the two frames and a pinion 109 engages tube 103 and is fixedly provided with a pointer 110.

If the driving shaft 101 is rotated, the stationary frame 105, the arms 107, the weights 106, the movable frame 104 and the tube 103 turn together and a centrifugal force is imparted to the weights 106 for moving the same outwardly in the radial direction, and become steady at a position at which the spring force and the centrifugal force are balanced. This apparatus is so constructed that tube 103 is moved upwardly by the centrifugal force of the weights 106 and the pinion 109 is turned and the pointer 110 indicates a designated reading.

This conventional apparatus has such crucial defects that a changeable rotation of a wire cable (not shown) causes fluctuation of the pointer 110 and the weights 106 are subjected to various impact from the vehicle and the like and move especially in the vertical upward and downward directions, so that fluctuation of the pointer 110 is very large.

Figure 3A:
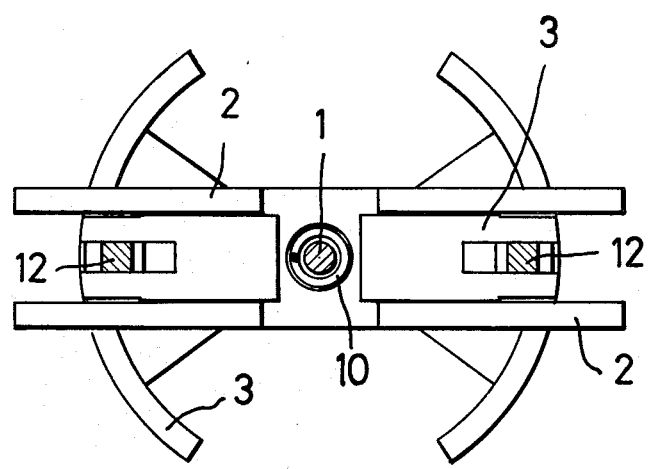
Figure 3B:
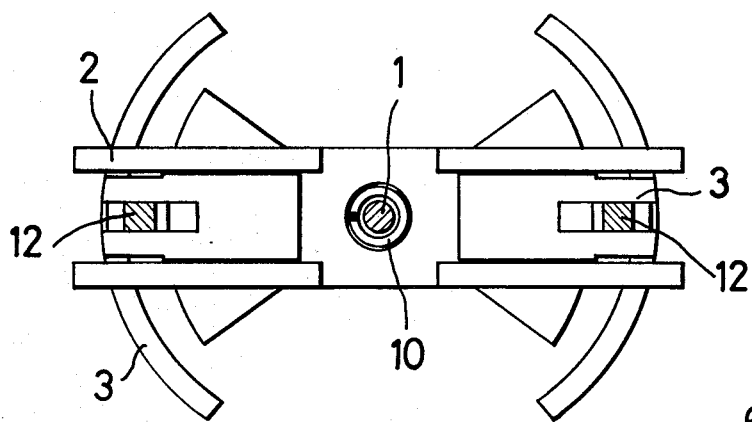
Figure 5:
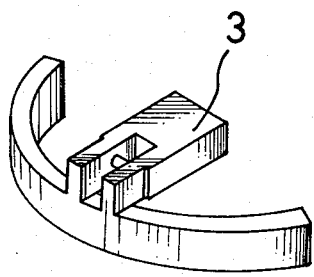
Figure 4:
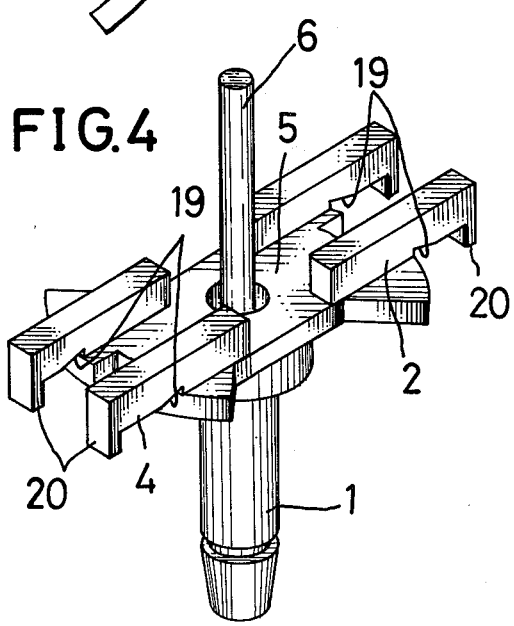

According to the Figures, a driving shaft made of synthetic resin 1 arranged to be rotated with rotation of a wheel shaft (not shown) being transmitted thereto. IThe driving shaft 1 is provided at its desired portion with a pair of guide members 2,2 for weights in such a manner that those members 2,2 are integral one with another and extend in the radial direction so as to be opposite one to another (see FIG. 3). A pair of weights 3,3 each having a given weight are formed into an arc at its outer periphery portion (see FIG. 5) and are mounted in the pair of the guide members 2,2 so as to be slidably movable in the radial direction and restrained in movement in the vertical upward and downward direction by lower surfaces 4,4 and upper surfaces 5,5 of the guide member 2,2.

An upper portion 6 of the driving shaft 1 is inserted into an opening 8 of a thrust collar 7, and the thrust collar 7 is urged upwards in the axial direction by a spring 10 through a sheeting member 9.

Additionally, an arm collar 11 is mounted rotatably on the other periphery of the thrust collar 7 and both sides of the arm collar 11 and the desired portions of the weights 3,3 are pivotally interconnected through a pair of arms 12,12. Each arm 12 is connected thereto so that both ends may be movable about respective pins 13,13.

Further, the lower surfaces 4,4 of the pair of the foregoing guide members 2,2 for restraining the vertically upward movement of the weights 3,3, are provided at their respective portions near the center thereof with recessed escape portions 19,19. Stoppers 20,20 are employed to limit the movement of weights 3,3 in the outwardly radial direction. A flange 21 is provided on the outer periphery of the thrust collar 7. The thrust collar 7 is guided and prevented from rotation by a bearing member 15 provided integrally with a scale member 14 fixed to a meter casing (not shown).

When the thrust collar 7 is moved downward, a turning force is generated in thread engaging portion 17 of a pointer shaft 16 arranged to be engaged with an inlet narrowed portion 18 of the thrust collar opening portion 8. Thereby the pointer 11 is swung to turn, and thus it indicates a vehicle speed in accordance with the displacement amount of the thrust collar 7 in the vertical direction thereof.

Figure 6:
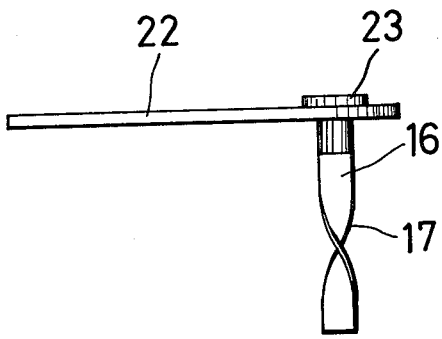
Figure 7A:
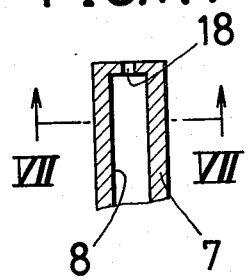
Figure 7B:
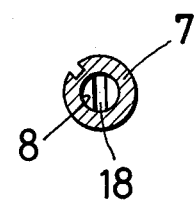

FIGS. 6 and 7 are views which disclose engagement between the pointer shaft 16 and the thrust collar opening 8. The pointer shaft 16 is made of sheet metal and is formed into a thread engaging portion 17 by being twisted into any desired angle. A narrowed portion 18 is formed at the inlet of the thrust collar opening 8 whereby the sheet metal with threads can be inserted therein.

In the case where the pointer shaft 16 having the thread engaging portion 17 is inserted in and is slidably engaged with the thrust collar opening 8, the thrust collar 7 cannot be turned because the same is prevented from rotation by the bearing member 15, but the pointer 22 is free so that the same can be turned when the thrust collar 7 is moved vertically downwards.

If the following is assumed:

$\delta$: Vertical movement amount of the thrust collar, $\alpha$: Twist angle of the pointer shaft sheet portion, $\lambda$: Length of the twist portion of the pointer shaft, and : Length $\theta$: Swing angle of the pointer, a relative formula $\delta \cdot \alpha = \lambda \cdot \theta$ is established, and movement of the thrust collar 7 and the swing angle of the pointer 22 are in proportion one to another, and therefore the pointer indicates corresponding graduation of speed scale or of a rotation number scale.

Figure 8:
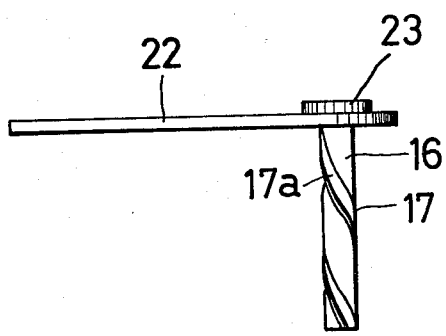
Figure 9A:
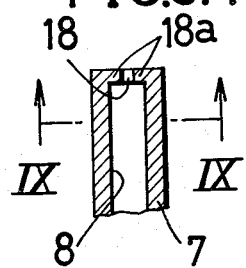
Figure 9B:
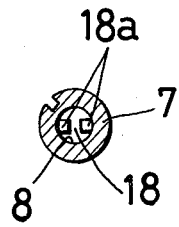

FIGS. 8 and 9 show another example of the engagement between the pointer shaft 16 and the thrust collar opening 8. The pointer shaft 16 is formed into a thread engaging portion 17 by making two thrust grooves 17a,17a in opposite sides of the periphery of the pointer shaft of a round rod form. A pair of facing projections 18a,18a, are provied in the inlet of the corresponding thrust collar opening 8, forming therebetween a narrowed portion 18 so that the thread engaging portion 17 comprising the two thread grooves can be inserted therein. In this case, it is the same as the above example, in that the swing angle of the pointer 22 is in proportion to the vertical movement of the thrust collar 7.

Thus, when the driving shaft 1 begins to rotate, the thrust collar 2 is moved downward by the centrifugal forces of the weights, and the pointer shaft 16 is turned through the thrust grooves 3,3 engaged with the projections 18a,18a. The number of the thrust groove 17a may be enough with only one.

Figure 2:
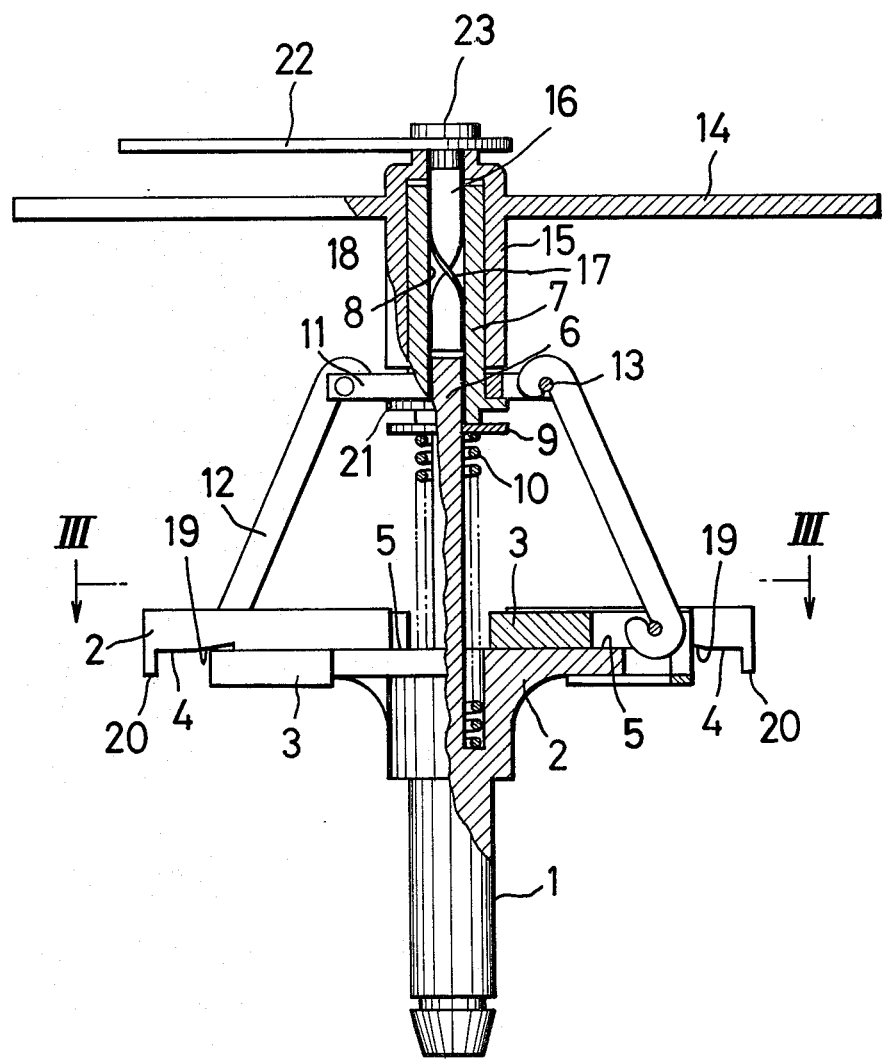

In order to prevent rotation of the thrust collar 7, (see FIG. 2), the bearing member 15 engages the thrust collar 7 and is formed integrally with scale 14, however, this arrangement causes a defect since in order to have an indication of the pointer 22 coincident with a zero position of the sacle 14 on completion of the assembled parts of a speedometer, corrective steps must be taken. For instance, to previously design a speedometer so that the pointer indicates the reading below the zero position and thereafter is held at the zero position by a stopper. Another approach involves improvement to the accuracy of the relative parts, however, it causes additional defects that the pointer reading is liable to go beyond the permissible range prescribed, and manufacturing costs become comparatively high.

Figure 10:
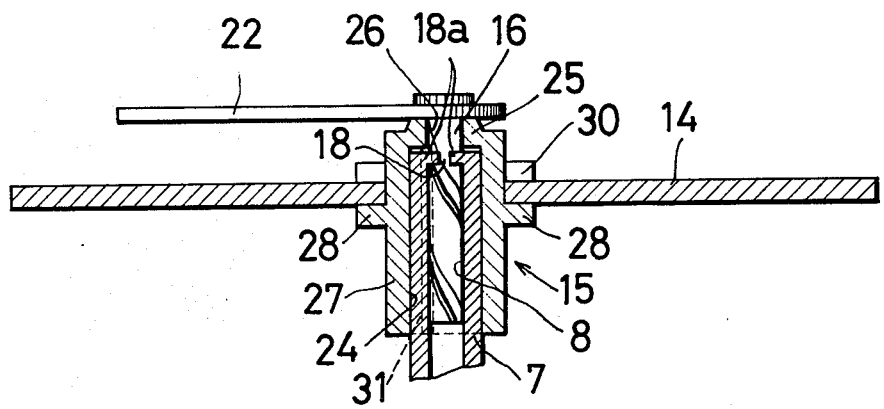
FIG. 10 is a sectional view of another example of the bearing member.
Figure 11:
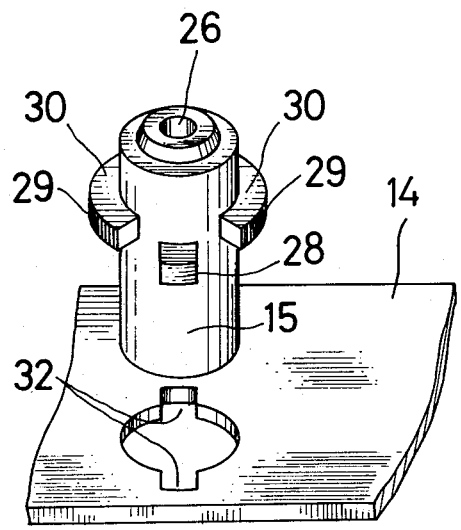
FIG. 11 is a disassembled perspective view thereof.

In order to remove the above defects, according to this invention, the bearing member 15 is made, for instance, as shown in FIG. 10 and FIG. 11.

The bearing member 15 is formed into a cylindrical tubular body and is provided at its one end with an opening 24 in which the thrust collar 7 is to be mounted, and at its other end with a cover 25 of which the center portion is provided with a hole 26 for the pointer shaft.

Additionally, on the upper and outer periphery of the tube portion 27, a pair of projections 28,28 are provided integrally therewith on the opposite sides thereof. At a higher level than projections 28,28 and in a direction perpendicularly thereto, brims 30,30 each having an indented notch 29 are provided for prevention of slip in its outer peripheral surface. These brims 30,30 are provided integrally therewith on the opposite sides thereof. A rib 31 projecting integrally from the inner peripheral surface of the cylindrical tube portion 27 of the bearing member 15, is arranged to be engaged with an axially extending groove 34 made in the outer peripheral surface of the thrust collar 7 so that the thrust collar 7 is prevented from rotation thereby.

A hole 33 is provided having a pair of facing escape portions 32,32 in a desired portion of the scale 14 on which graduations for speed or the like are described.

According to this arrangement, on assembly of this invention apparatus into a speedometer, a driving portion (not shown) of a speedometer is rotatably incorporated with the thrust collar 7 mounted in a speedometer body (not shown), and a tip portion of the thrust collar 7 is inserted through the scale 14 so as to be exposed from the hole 33 of the scale 14, and the scale 14 is fixed to the foregoing body.

The rib portion 31 of the bearing member 15 is coincident with the engaging groove 34 formed in the outer peripheral surface of the thrust collar 7 and is inserted therein. The lower surface of the pair of right and left brims 30,30 come to abut the upper surface of the scale 14. In the course of this operation, the pair of projections 28,28 positioned at a different lower level than the pair of brims 30,30 are passed through the escape portions 32,32 of the hole 33 and reaches below the scale 14. From this condition, when the notch portions 29,29 made in the respective outer peripheries of the brims 30,30 are held by fingers and the bearing member 15 is turned thereby; the scale 14 is interposed and held between the brims 30.30 and the projections 28,28. At that time, the thrust collar 7 is turned together with the bearing member 15 which has been prevented from rotation by engagement thereto.

Next, the pointer shaft 16 is mounted in the thrust collar 7 by being passed through the hole 16 of the cover portion 25 of the bearing 26 portion. In this case, the pointer shaft 16 is inserted in such a manner that the pair of screw grooves made therein may be engaged with a pair of projections provided on the inlet of the thrust collar opening and at the same time it is being rotated during insertion.

Though the pointer mounted therein indicates approximately a zero position of the scale 14, the same can be thereafter adjusted to indicate the zero position accurately and easily because the bearing member 15, and accordingly, the thrust collar can be moved while the pointer shaft integral therewith can be moved by the turning operation of the brims 30.30. Further, thereafter, the scale 14 and the bearing member 15 are finally positioned together by an adhesive agent or any other suitable means.

When the driving shaft 1 is rotated (either rotation of the right and left directions is possible) in proportion to a vehicle speed, the weights 3,3, the arms 12,12, and the arm collar 11 are rotated together. The weights 3,3 are given a centrifugal force, so that they move respectively in radially outward directions along the pair of guide members 2,2 provided integrally with driving shaft 1. Accordingly, the arm collar 11 connected through the arms 12,12 is pushed downward and the thrust collar 7 of which the flange 21 is pushed downward against the spring 10, and becomes steady at a position at which the forces are balanced.

As the thrust collar 7 is moved downward, a turning force is produced in the thread engaging portion 17 of the pointer shaft engaged with inlet narrowed portion 18 of the thrust collar opening 8, so that the pointer 22 is swung to indicate a certain reading in accordance with the displacement amount of the vertical direction of the thrust collar 7 in proportion to a vehicle speed.

As the rotation speed of the driving shaft 1 is gradually decreased, the centrifugal force given to the weights 3,3, is weakened so that the weights 3,3 are moved in the radially inward directions, and the thrust collar 7 is moved upward by the force of the spring 10. Accordingly, the pointer gradually indicates a smaller reading, but because the weights 3,3 move slidably along the guide members 2,2, the reading property of the pointer tends to become non-linear due to frictional resistance therebetween. In order to minimize the above during actual use, the amount of the weights 3,3 and the spring constant of the spring 10 are set within the range to reduce any problem during practical use. Also the escape portions 19,19 are made in the surfaces of the guide members 2,2, so that the pointer 22 may be able to be easily returned to the zero position at the time of stopping of the vehicle.

According to the present invention, the pointer 22 of a meter has no direct relation to the driving shaft 1 in operation and also is so constructed, that the movement of each weight 3 in the vertical upward and downward direction is prevented and at the same time, the slidable movement in the radial inward and outward directions is permitted by each guide member 2 provided integrally on the driving shaft 1. The weight 3 follows the guide member 2 and always rotates integrally and synchronously with the driving shaft 1, so that there is no difference in time of fastness and slowness.

Therefore, the invention apparatus offers the following advantages:

(a) Fluctuation of the pointer is difficult to occur due to a proper frictional force of slidable movement.

(b) Since the weight and the driving shaft always rotate synchronously with each other, there is no changeable rotation of the driving shaft especially at the time of a low speed.

(c) Since the displacement of the weight in the vertical direction is restrained, no fluctuation of the pointer is produced by shock or vibration, or the like.

Further, in accordance with another feature of this invention, the pointer shaft bearing member is prepared separately from the scale and is inserted into and engaged with the scale at different height level projections made on the outer periphery thereof, so that indication of the pointer can be coincided with a zero position of the scale simply and accurately.

Many modifications and variations of the present invention are possible in light of the above teachings. It is, therefore, to be understood that within the scope of the appended claims, the invention may be practiced otherwise than as particularly described.

What I claim is:

1. An indicating apparatus in a centrifugal force type meter employing weight members each having arcuately shaped peripheral surfaces and being radially directed to rotate with a driving shaft for transmission to a thrust member disposed in the axial direction thereof; said driving shaft being provided with weight guiding member means having flat upper surfaces adjacent said shaft and lower surfaces spaced from said shaft, said weight members having surfaces engaging said guiding member surfaces, to thereby guide said weight member in a radial direction and preventing the vertical movement thereof; pointer means disposed in relation to a scale responsive of said thrust member wherein: said thrust member being formed as a tubular body having an opening portion in the central axial direction thereof; and said pointer means being provided with a turning shaft formed into a screw shaft being turned by engagement with a narrowed portion of said tubular body at the opening portion thereof and bearing means being provided with a bayonet connection for receiving said screw shaft of said pointer means, said thrust member being inserted in working engagement with said scale being adapted to retain said scale between upper and lower projections provided on the outer periphery of said bearing member.

* * * * *